United States Patent [19]
Boltz et al.

[11] Patent Number: 5,943,620
[45] Date of Patent: *Aug. 24, 1999

[54] METHOD FOR ASSOCIATING ONE DIRECTORY NUMBER WITH TWO MOBILE STATIONS WITHIN A MOBILE TELECOMMUNICATIONS NETWORK

[75] Inventors: David Boltz, Garland; Bret Westbrook, Irving, both of Tex.

[73] Assignee: Ericsson Inc., Research Triangle Park, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/760,946

[22] Filed: Dec. 9, 1996

[51] Int. Cl.⁶ ................................................ H04Q 7/20
[52] U.S. Cl. ................................. 455/445; 455/433
[58] Field of Search ....................... 455/422, 433, 455/445, 462–463, 465, 557, 558

[56] References Cited

U.S. PATENT DOCUMENTS

| | | | |
|---|---|---|---|
| 5,357,558 | 10/1994 | Yoshikawa | 455/463 |
| 5,454,032 | 9/1995 | Pinard et al. | 455/445 |
| 5,600,704 | 2/1997 | Ahlberg et al. | 455/445 |
| 5,699,407 | 12/1997 | Nguyen | 455/462 |

FOREIGN PATENT DOCUMENTS

WO 94/17644  8/1994  WIPO.
WO 96/31073  10/1996  WIPO.

OTHER PUBLICATIONS

EPO International Search Report dated Aug. 04, 1998.
Ballot Version; TR–45; International Implementation of Wireless Telecommunication Systems; Compliant with TIA/EIA/IS–41; Proposed TSB–29 Revision B (PN–3173); May 4, 1993; pp. i–ii and 1–9.

Primary Examiner—Nguyen Vo
Attorney, Agent, or Firm—Jenkens & Gilchrist, P.C.

[57] ABSTRACT

A home location register (HLR) associated with a particular mobile subscription correlates two different international mobile subscriber identity (IMSI) numbers with a particular mobile subscriber integrated service digital network (MSISDN) number. When an incoming call connection is received towards that MSISDN number, the HLR makes a determination as to which one of the two mobile stations associated with the two IMSI numbers is active. The incoming call connection is then forwarded to the active mobile station. In case both mobile stations are active, the received incoming call connection is rerouted to the mobile station preassigned as a primary mobile station.

10 Claims, 7 Drawing Sheets

METHOD FOR ASSOCIATING ONE DIRECTORY NUMBER WITH TWO MOBILE STATIONS WITHIN A MOBILE TELECOMMUNICATIONS NETWORK

BACKGROUND OF THE INVENTION

1. Technical Field of the Invention

The present invention relates to a mobile telecommunications network and, in particular, to the provision of mobile service to two mobile stations having the same Mobile Subscriber Integrated Service Digital Network (MSISDN) number.

2. Description of Related Art

With conventional wireline telecommunications networks, a number of telephone terminals are often connected to a single telephone line. Consequently, any one of the connected wireline terminals can utilize the associated telephone line to originate outgoing calls and to receive incoming calls over the serving telecommunications network using the associated subscriber data and subscription (e.g., a billing account). These terminals are often referred to as extension phones.

With the introduction of a mobile telecommunications network, such as the Global System for Mobile (GSM) communication and the Personal Communications System (PCS), the concept of wireline telephone service and wireless telephone service has changed drastically. Instead of assigning a telephone number for a particular geographic location or telephone line, in accordance with the GSM or PCS, a telephone number is assigned towards a particular mobile station, or more particularly, the mobile subscriber associated with that mobile station. As a result, each subscriber has a Subscriber Identity Module (SIM) card used for storing necessary mobile subscriber information. The SIM card comprises a detachable memory unit that may be freely associated with any available mobile station. The stored subscriber information includes a mobile subscriber's International Mobile Subscriber Identity (IMSI) number, or other user specified information, such as preferred speed dialing lists or screening lists. By inserting a mobile subscriber's SIM card into a mobile station, the subscriber information stored in the inserted SIM card is available to the mobile subscriber's new terminal. As a result, the mobile subscriber is able to freely utilize any available mobile station while maintaining the same directory number, such as a Mobile Subscriber Integrated Service Digital Network (MSISDN) number, and subscriber feature data.

However, unlike wireline terminals, because each SIM card and its associated mobile station is identified using a unique IMSI number, it is conventionally not possible to assign two different mobile stations or IMSI numbers with the same directory number or MSISDN number. As an illustration, if a mobile subscriber has a vehicle mounted mobile station and a portable handheld mobile station, the mobile subscriber has to subscribe to two different mobile subscriptions and be assigned with two different directory numbers to concurrently utilize both mobile stations. As a result, the mobile subscriber must inconveniently maintain two different subscriber feature data, subscription, and dialable directory numbers for his or her mobile stations. As an alternative, the mobile subscriber may detach the tiny SIM card from one mobile station (e.g., vehicle mounted mobile station) and inserted into the other mobile station (e.g., handheld mobile station) each time the subscriber wishes to switch from one mobile station to the other. However, such a manual switching is rather inconvenient. Furthermore, two mobile subscribers belong to the same household, for example, cannot utilize two different mobile stations at the same time to originate outgoing calls while utilizing the same subscriber data and charging the incurred costs to the same subscription.

Accordingly, there is a need for a mechanism to enable two mobile subscribers and their associated mobile stations to originate and terminate call connections using the same directory number and subscription data.

SUMMARY OF THE INVENTION

The present invention discloses a method and apparatus for correlating a single MSISDN number with two International Mobile Subscriber Identity (IMSI) numbers, each associated with a mobile station. An initial incoming call connection is received by a gateway mobile switching center (GMSC) associated with the dialed directory number (MSISDN number). The GMSC then transmits a signal requesting routing instructions to a home location register (HLR) associated with the dialed directory number. The HLR, in turn, determines whether the received directory number is associated with more than one IMSI number. If the received directory number is associated with only one IMSI number, the rerouting of the incoming call connection is processed in a conventional manner to a mobile station associated with that IMSI number. However, if there are two mobile stations or IMSI numbers associated with the dialed directory number, a determination is then made as to which mobile station is currently activated. The received incoming call is then rerouted to the activated mobile station. If both mobile stations are currently activated, the mobile station preassigned as the primary mobile station is then identified and the incoming call connection is thereafter rerouted to the primary mobile station.

As another embodiment of the present invention, in case one of the mobile stations attempts to dial the other mobile station associated with the same MSISDN number, the HLR determines that a first IMSI number associated with the calling party mobile station and a second IMSI number associated with the called party mobile station are both correlated with the dialed MSISDN number. As an illustration, a determination is made that the calling party mobile station is associated with the first IMSI number. In response, the received incoming call connection is routed to the mobile station associated with the second IMSI number.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
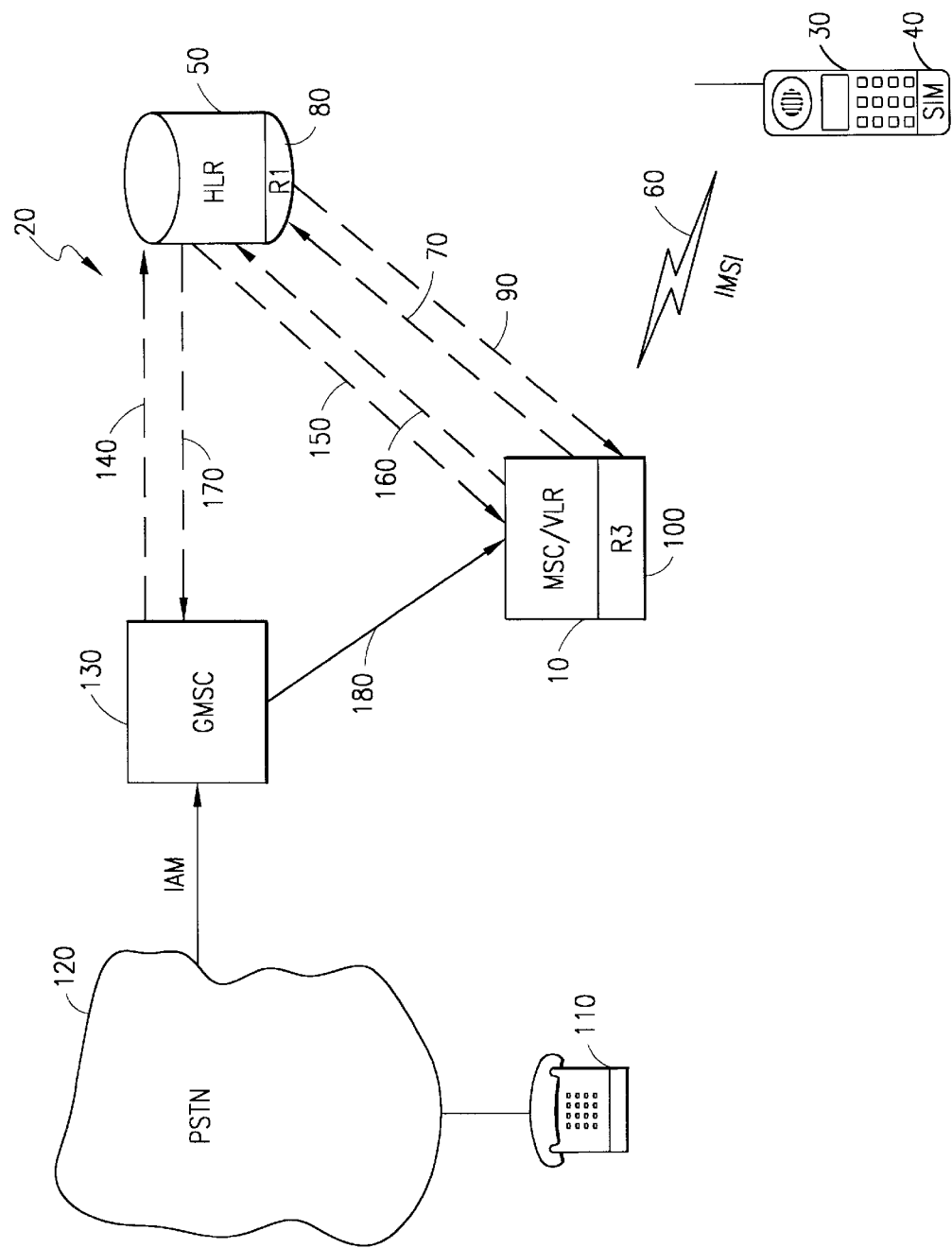
FIG. 1 is a block diagram of a mobile telecommunications network illustrating the routing of an incoming call connection towards a mobile station.

FIG. 1 is a block diagram of a mobile telecommunications network 20 including a mobile switching center/visitor location register (MSC/VLR) 10 providing mobile service to a mobile station 30. Attached to the mobile station 30 (also known as a mobile terminal) is a subscriber identity module (SIM) card 40 storing subscriber specific information. Such information includes an International Mobile Subscriber Identity (IMSI) number identifying the mobile subscriber, and other subscriber related data including preferred speed dialing lists and screening lists. In accordance with the Global System for Mobile (GSM) or Personal Communications System (PCS) standards, by inserting a mobile subscriber's SIM card 40 into a mobile station 30, the stored subscriber information in the inserted SIM card 40 is made available to the mobile subscriber's terminal (hereinafter, the mobile station 30 and the SIM card 40 are collectively referred to as a mobile station). One benefit of SIM card use is that the mobile subscriber is able to freely utilize any available mobile station while maintaining the same directory number, such as a Mobile Subscriber Integrated Service Digital Network (MSISDN) number, and subscriber feature data.

Whenever the mobile station 30 travels into a particular mobile switching center (MSC) coverage area, the mobile station 30 performs a location update with an associated home location register (HLR) 50. Accordingly, the mobile station 30 transmits its assigned IMSI number over a radio interface 60 to the MSC/VLR 10 serving that particular MSC coverage area. Realizing that this is a newly registering mobile station within its coverage area, the MSC/VLR 10 then performs the location update procedure with the HLR 50 to inform the HLR 50 of the mobile station's new location. A Mobile Application Part (MAP) based location update signal 70 with the current location information is transmitted to the HLR 50. As a result, such location information is stored at a memory location R1 80 associated with the HLR 50. In response, an acknowledgment MAP based signal 90 is transmitted back to the serving MSC/VLR 10. Additional subscriber data, such as preferred long distance carrier data, may also be downloaded from the HLR 50 to the MSC/VLR 10. Such additional data, along with the data identifying the mobile station 30, are then placed at a memory location R3 100 associated with the serving MSC/VLR 10.

Within a mobile telecommunications network, there are two types of identification numbers associated with a particular subscription or subscriber: a directory number, such as a MSISDN number; and a mobile station or SIM card identification number, such as an IMSI number. A dialable MSISDN directory number is utilized by a calling party subscriber to originate a call connection to a particular subscriber. The IMSI number is then utilized by the serving mobile telecommunications network to identify and to locate a particular mobile station associated with the called party subscriber.

Accordingly, whenever an incoming call connection is received towards the directory number representing a particular mobile subscriber or subscription, the HLR 50 and the serving MSC/VLR 10, along with a number of other telecommunications nodes, work in conjunction to reroute the received incoming call connection to a mobile station associated with the called party subscriber. As an illustration, a wireline terminal 110 associated with a Public Switched Telephone Network (PSTN) 120 originates an outgoing call connection using a particular MSISDN number as the called party number. A local exchange (not shown in FIG. 1) serving the wireline terminal 110 originates a call setup message, such as an Initial Address Message (IAM), indicating the dialed MSISDN number as the called party number. Utilizing the provided MSISDN number as the routing address, the connected Public Switched Telephone Network (PSTN) 120 appropriately routes the IAM message to a gateway mobile switching center (GMSC) 130 associated with the provided MSISDN number.

Because the GMSC 130 has no means to determine the current location of the mobile station 30 associated with the called party subscriber, a signal 140 requesting routing instructions is transmitted to the HLR 50. Such a signal includes a MAP based Send Routing Information (SRI) signal. Utilizing the previously updated location information stored at the memory location R1 80, the HLR 50 identifies the MSC/VLR 10 currently serving the mobile station 30 associated with the called party subscriber. The HLR, in turn, transmits another MAP based signal 150 requesting a roaming number towards the serving MSC/VLR 10. Such a signal includes a MAP based Provide Roaming Number (PRN) signal. The serving MSC/VLR 10, by accessing the subscriber data in the memory location R3 100, determines that the mobile station 30 is indeed registered within its coverage area and returns a roaming number representing the mobile station back to the HLR 50 via another signal 160. The HLR 50 then forwards the received roaming number to the requesting GMSC 130 via another signal 170. Utilizing the received roaming number as a new destination address, the GMSC 130 then reroutes the received incoming call connection to the serving MSC/VLR 10 (signal link 180). The mobile station 30 traveling within a particular location area within the serving MSC coverage area is then paged. As a result, a communication link is established between the calling party subscriber 110 and the called party mobile station 30.

Within a conventional mobile telecommunications network as fully described above, it is not possible to assign two different mobile stations and associated SIM cards with the same MSISDN number. Accordingly, a mobile subscriber(s) wanting two different mobile stations currently must maintain two different subscriptions and two corresponding MSISDN numbers.

Figure 2:
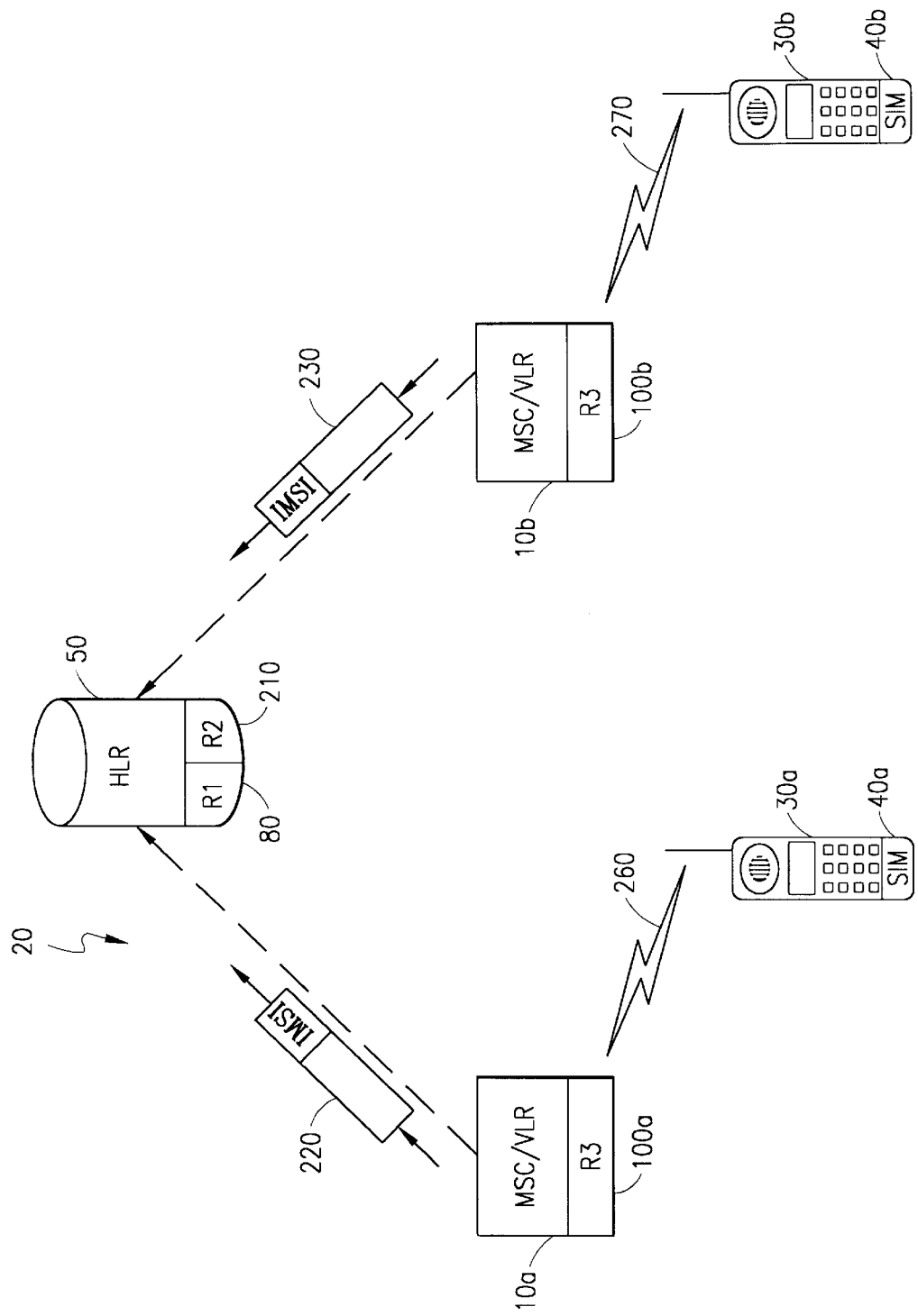
FIG. 2 is a block diagram of a mobile telecommunications network illustrating two different mobile stations with the same directory number performing location updates with an associated home location register (HLR) in accordance with the teachings of the present invention.

FIG. 2 is a block diagram of the PLMN 20 illustrating two different mobile stations 30a–30b with the same MSISDN number performing location updates with the HLR 50 in accordance with the teachings of the present invention. The HLR 50 associated with a particular MSISDN number includes correlation data associating that particular MSISDN number with two different IMSI numbers. As an illustration, the memory location R1 80 contains data representing the first IMSI number and its associated mobile station 30a. Similarly, a memory location R2 210 contains data representing the second IMSI number and its associated mobile station 30b. The two memory locations R1 and R2 are then correlated with the MSISDN number by the HLR 50.

In a conventional manner, whenever each of the two mobile stations travels into or turns on its unit within a MSC coverage area, a serving MSC/VLR performs a location update with the HLR 50. For example, for the first mobile station 30a associated with a first SIM card 40a, after receiving a first IMSI number 260 from the first mobile station 30a, a first MSC/VLR 10a transmits a MAP based location update signal 220 toward the associated HLR 50. If the first mobile station has entered the first MSC/VLR coverage area for the first time, the first MSC/VLR performs a Location Updating Request—Type Normal to inform the HLR 50 of the mobile station's new location. After receiving the location update signal 220 with the first IMSI number, the HLR 50 determines which MSISDN number is associated with this particular IMSI number and identifies the appropriate memory location to store the received data. As a result, the memory location R1 80 associated with the HLR 50 contains data indicating the current location of the first mobile station 30a. The status representing the first mobile station 30a is also changed to "active". The memory location R3 100a associated with the first MSC/VLR 10a further contains data representing the newly registered first mobile station 30a. Thereafter, in case the first mobile station 30a turns off its unit, the first mobile station 30a first transmits an IMSI detached signal to the first MSC/VLR 10a. The IMSI detached signal notifies the serving network that the mobile station is going to switch off the phone, and no paging for an incoming call connection is to be performed thereto. In case the mobile station turns its unit back on within the same geographic area, an IMSI attach procedure is performed to notify the network that the mobile station is again accessible. Such IMSI detached and attach signals may be further transmitted from the first MSC/VLR 10 to the HLR 50 to inform the HLR 50 of the mobile station's accessibility. Accordingly, along with the initial location update signal 220, such IMSI detached and attach signals may further enable the HLR 50 in determining whether the status of the mobile station is "active" or not.

In a similar manner, whenever the second mobile station 30b associated with the second SIM card 40b enters a new MSC coverage area, the second mobile station 30b transmits a second IMSI number to a second MSC/VLR 10b. The second MSC/VLR 10b then similarly transmits a MAP based location update signal 230 towards the HLR 50. The HLR 50 then determines which MSISDN number is associated with the second IMSI number and identifies the appropriate memory location to store the received data. As a result, the memory location R2 210 within the HLR 50 stores data representing the second mobile station's current location. The memory location R3 100b associated with the second MSC/VLR 10b also stores data representing the newly registering second mobile station 30b.

The memory location R1 80 representing the first mobile station 30a and the memory location R2 210 representing the second mobile station 30b are then correlated with a particular MSISDN number within the HLR 50.

Figure 3:
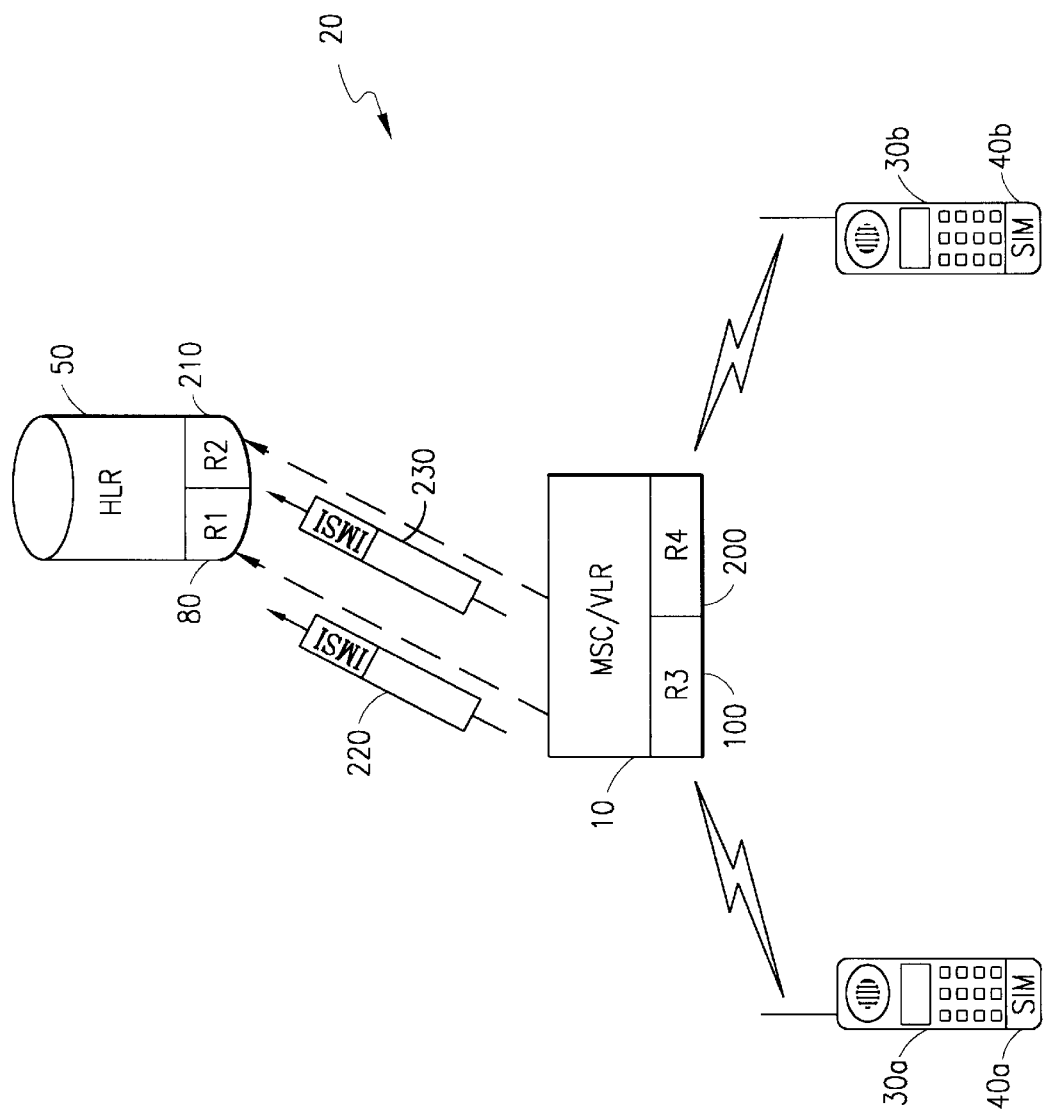
FIG. 3 is a block diagram of a mobile telecommunications network illustrating two different mobile stations being served by the same mobile switching center/visitor location register (MSC/VLR) and performing location updates with an associated HLR.

As another embodiment of the present invention, FIG. 3 is a block diagram of the PLMN 20 illustrating two different mobile stations 30a–30b with the same MSISDN number being served by the same MSC/VLR 10 and performing location updates with the HLR 50. Although both mobile stations 30a–30b are associated with the same MSISDN number, there are still identified by the serving MSC/VLR 10 via their respective IMSI numbers. Accordingly, the first mobile station 30a associated with the first SIM card 40a performs a location update with the serving MSC/VLR 10. The serving MSC/VLR 10 then forwards the location update information 220 to the associated HLR 50 using the received first IMSI number. As a result, the memory location R1 80 associated with the HLR 50 and correlated with the MSISDN number stores data representing the current location of the first mobile station 30a. The memory location R3 100 associated with the MSC/VLR 10 further stores data representing the first mobile station 30a. Thereafter, the second mobile station 30b associated with the second SIM card 40b also attempts to register with the same MSC/VLR 10. The MSC/VLR 10, in turn, transmits another MAP based location update signal 230 with the second IMSI number received from the second mobile station 30b. The memory location R2 210 also associated with the HLR 50 and correlated with the same MSISDN number is then updated with the current location of the second mobile station 30b. The memory location R4 200 within the serving MSC/VLR 10 also stores data representing the second mobile station 30b. Accordingly, as far as the serving MSC/VLR 10 is concerned, there are two distinctively different mobile stations registered within its coverage area. Only the HLR 50 maintains data correlating the two mobile stations and their corresponding IMSI numbers with a single MSISDN number.

Figure 4:
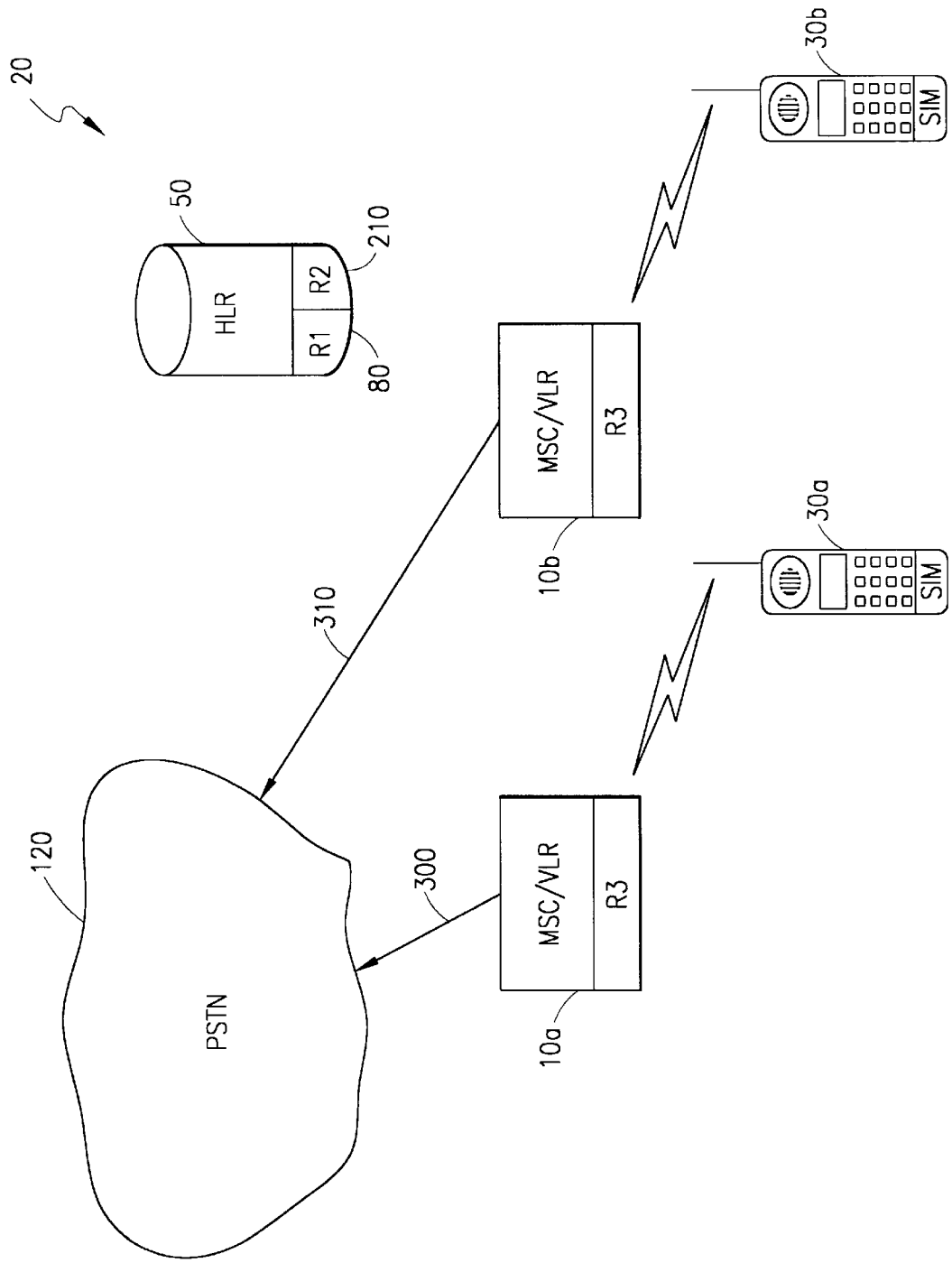
FIG. 4 is a block diagram of a mobile telecommunications network illustrating two different mobile stations with the same directory number originating outgoing call connections.

FIG. 4 is a block diagram of the PLMN 20 illustrating two different mobile stations 30a–30b with the same MSISDN number originating outgoing call connections. For outgoing call connections, no communication has to be performed with the associated HLR 50. Furthermore, no correlation to the associated MSISDN number needs to be made. The first MSC/VLR 30a serving the first mobile station 30a receives an instruction from the first mobile station 30a to originate an outgoing call connection. In response, the first MSC/VLR 10a transmits a call setup message, such as an Initial Address Message (IAM) 300, with the dialed directory number to the connected telecommunications network, such as the PSTN 120. In a conventional manner, a call connection with the intended called party terminal is then established. Similarly, the second MSC/VLR 30b serving the second mobile station 30b receives an indication to originate an outgoing call connection. As a result, the second MSC/VLR 30b also transmits an IAM signal 310 to the connected telecommunications network. Accordingly, a second outgoing call connection is established.

Figure 5:
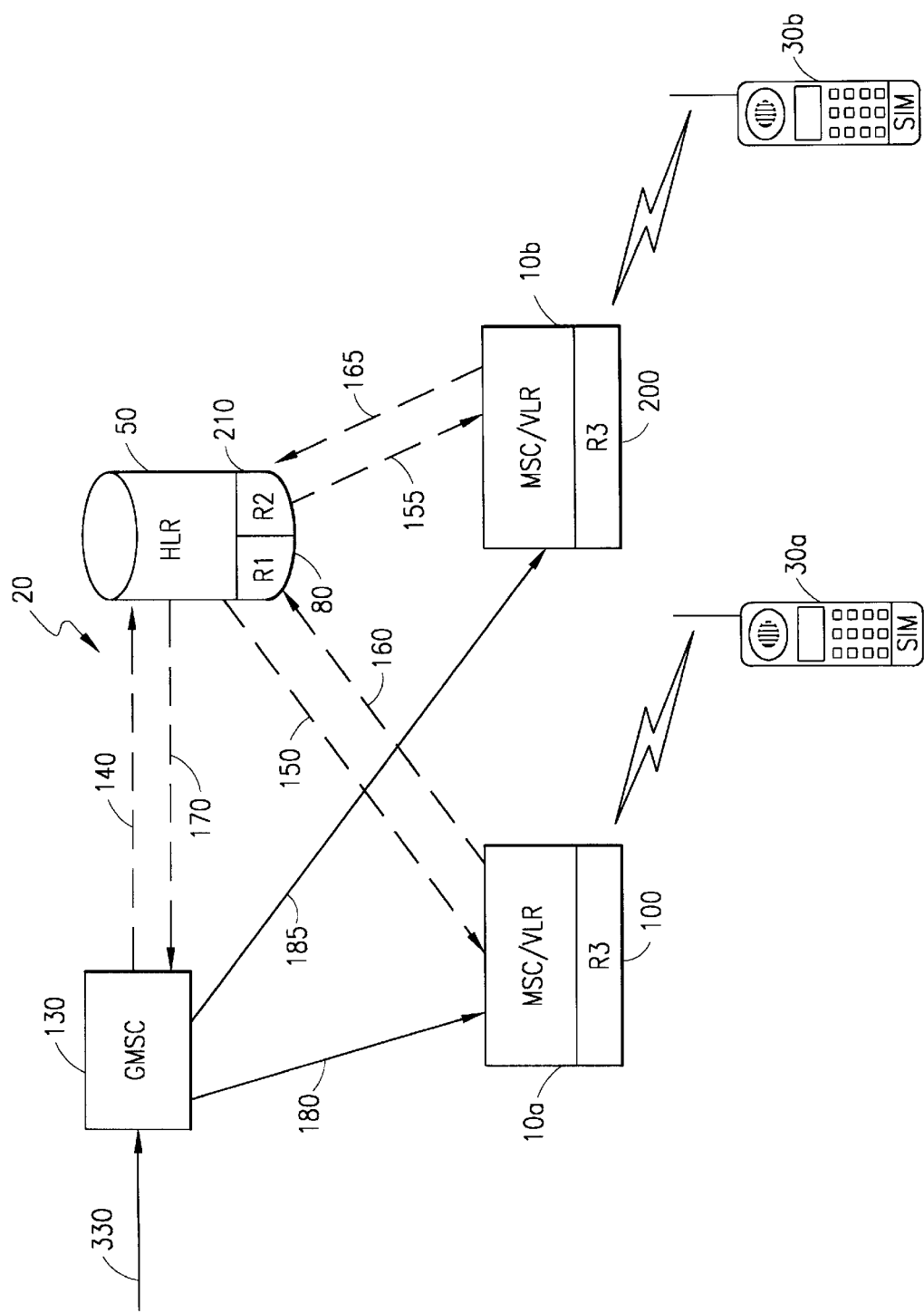
FIG. 5 is a block diagram of a mobile telecommunications network routing an incoming call connection to one of the two mobile stations associated with the dialed directory number in accordance with the teachings of the present invention.

FIG. 5 is a block diagram of the PLMN 20 routing an incoming call connection to one of the two mobile stations 30a–30b associated with the same dialed MSISDN number in accordance with the teachings of the present invention. An incoming call connection 330 is initially received by the GMSC 130 associated with the dialed MSISDN number. In a conventional manner, the GMSC 130 attempts to locate the called party mobile station by transmitting a MAP based signal 140 requesting routing instructions towards the associated HLR 50. The HLR 50 then determines which IMSI numbers are correlated with the indicated MSISDN number. If there are two IMSI numbers representing two mobile stations 30a–30b associated with the dialed MSISDN number, a determination is then made to select one of the mobile stations. Such a determination can be made in a number of different ways. For example, if only one mobile station has performed a location update and is therefore active, that activated mobile station is selected as the destination mobile station. On the other hand, if both mobile stations are active, the mobile station that has previously been assigned as a primary mobile station is instead selected as the destination mobile station. After selecting the destination mobile station, utilizing the appropriate data from the memory locations R1 80 and R2 210, a MAP based signal 150 requesting a roaming number is transmitted to the MSC/VLR serving the selected mobile station. As an illustration, the first mobile station 30a may be selected by the HLR 50 to receive the incoming call connection. As a result, the MAP signal 150 is transmitted to the first MSC/VLR 10a serving the first mobile station 30a. Utilizing the data stored in the memory location R3 100a, the MSC/VLR 10a determines the roaming number representing the first mobile station 30a and returns the determined roaming number back to the requesting HLR 50 via another MAP based signal 160. The HLR 50, in turn, forwards the received roaming number to the GMSC 130 with a MAP based signal 170. Utilizing the received roaming number as a new called party address, the receiving incoming call connection is then rerouted to the first MSC/VLR 10a (a new call connection 180). The first mobile station 30a is then paged by the first MSC/VLR 10a, and in response to page, a radio connection is established therewith.

Since the second mobile station 30b was not selected by the HLR 50, no MAP signals are communicated with the second MSC/VLR 10b. Consequently, as far as the second mobile station 30b is concerned, no incoming call connection has been attempted.

As another embodiment of the present invention, if both mobile stations are active, as fully described above, the MAP based signal 150 requesting a roaming number is transmitted from the HLR 50 to the first MSC/VLR 10a. However, if the first mobile station 30a is busy and unavailable to answer the incoming call, the first MSC/VLR 10a returns the MAP based signal 160 to the HLR 50 with an indication that the first mobile station is currently busy and unavailable. Such busy condition also takes into consideration subscriber features associated with the first mobile station 30a. If the first mobile station 30a has a subscriber feature (such as call waiting) active, even if the physical status of the mobile station is busy, the first MSC/VLR 10a determines that the first mobile station is able to receive the incoming call via the call waiting subscriber feature, and the requested roaming number is provided back to the HLR 50.

Accordingly, in response to the MAP based signal 160 indicating that the first mobile station 30a is busy, the HLR 50 then transmits another MAP based signal 155 to the second MSC/VLR 10b. The second MSC/VLR 10b then returns a roaming number representing the second mobile station 30b currently traveling within its service area to the HLR 50 via yet another MAP based signal 165. The HLR, in turn, forwards the received roaming number to the GMSC 130 via the MAP based signal 170. As a result, in case both mobile stations are active, and the primary mobile station is busy, the incoming call connection is forwarded to the secondary mobile station. A call connection 185 is then established with the second mobile station 30b.

Figure 6:
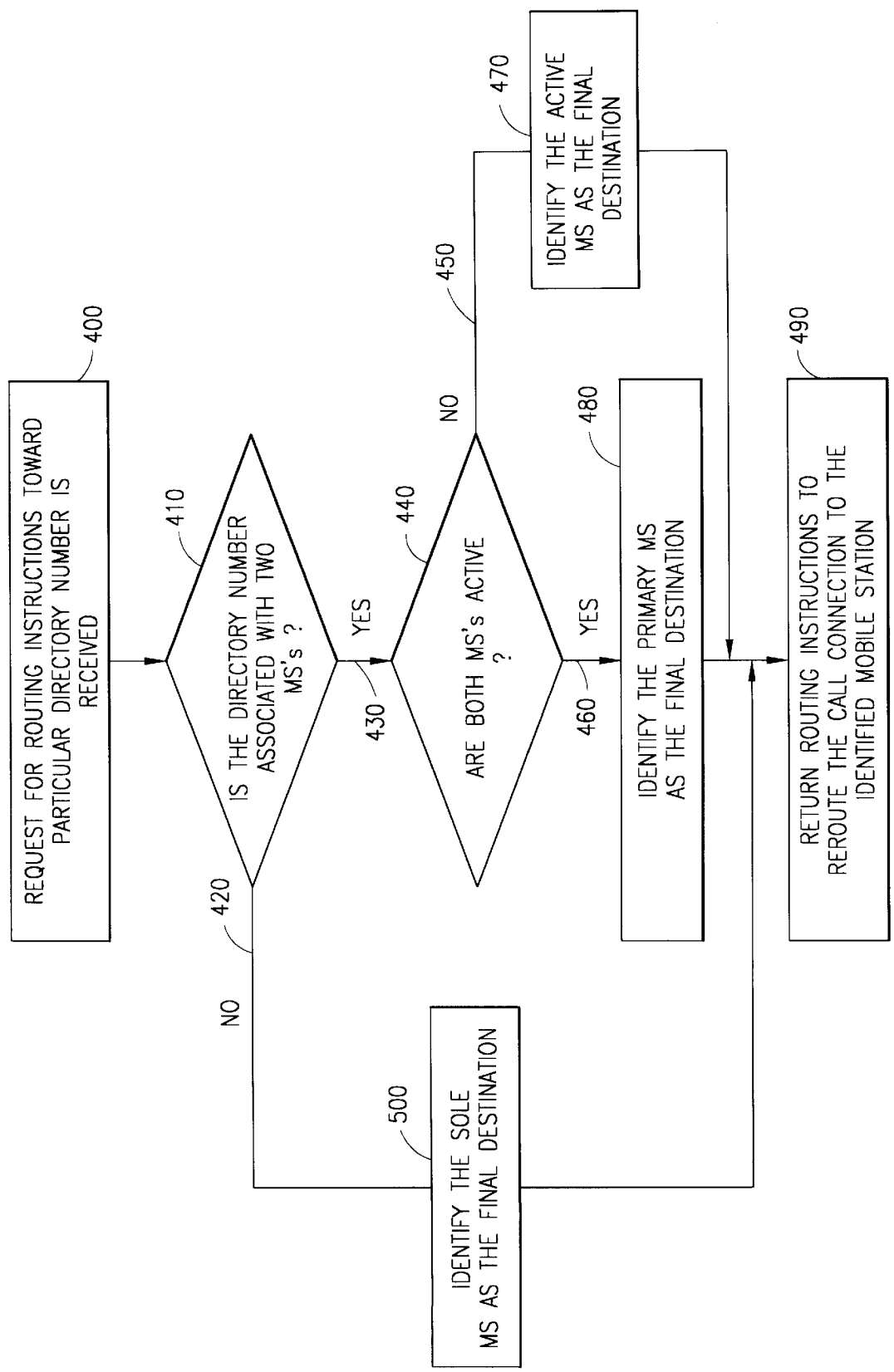
FIG. 6 is a flowchart illustrating the steps performed by an HLR to reroute an incoming call connection to one of the two mobile stations associated with the dialed directory number.

FIG. 6 is a flowchart illustrating the steps performed by an HLR to reroute an incoming call connection to one of the two mobile stations associated with the indicated MSISDN number in accordance with the teachings of the present invention. At step 400, a signal from the GMSC requesting routing instructions for a received incoming call connection is received. The HLR then determines how many IMSI numbers are associated with the indicated MSISDN number. If there is only one associated IMSI number (decision link 420), the HLR identifies a mobile station associated with that IMSI number as the destination address at step 500. If more than one IMSI number is correlated with the indicated MSISDN number (decision link 430), another determination is then made as to whether both mobile stations are current active. Such a determination can be made utilizing a number of factors. If a relevant mobile station has performed a location update, then the mobile station is active. Although the mobile station has performed a location update, if the HLR has subsequently received an IMSI detached signal from that mobile station, the mobile station is considered as inactive. If the mobile station thereafter transmits an IMSI attach signal to the HLR, then the mobile station is again consider activated.

If only one mobile station associated with the indicated MSISDN number is active (decision link 450), the active mobile station is then selected by the HLR as the destination address at step 470. However, if both mobile stations are active, a further determination is made by the HLR to identify the mobile station that has been preassigned as the primary mobile station at step 480. The primary mobile station is then identified as the destination mobile station.

Thereafter, routing instructions enabling the GMSC to reroute the received incoming call connection to the destination mobile station are transmitted. More particularly, a MSC/VLR serving the destination mobile station is identified and a MAP based signal requesting a roaming number is transmitted from the HLR. Upon receiving the requested roaming number back from the serving MSC/VLR, it is forwarded to the GMSC. As illustrated in FIG. 5, utilizing the provided roaming number as the new called party address, the GMSC reroutes the call connection appropriately.

As further illustrated in FIG. 5, in case both mobile stations are active and the primary mobile station is already busy, the HLR attempts to reroute the received incoming call connection to the secondary mobile station by retransmitting another request for a roaming number to the MSC/VLR serving the secondary mobile station. Thereafter, the received roaming number is provided to the GMSC to effectuate the rerouting of the received incoming call to the secondary mobile station.

Figure 7:
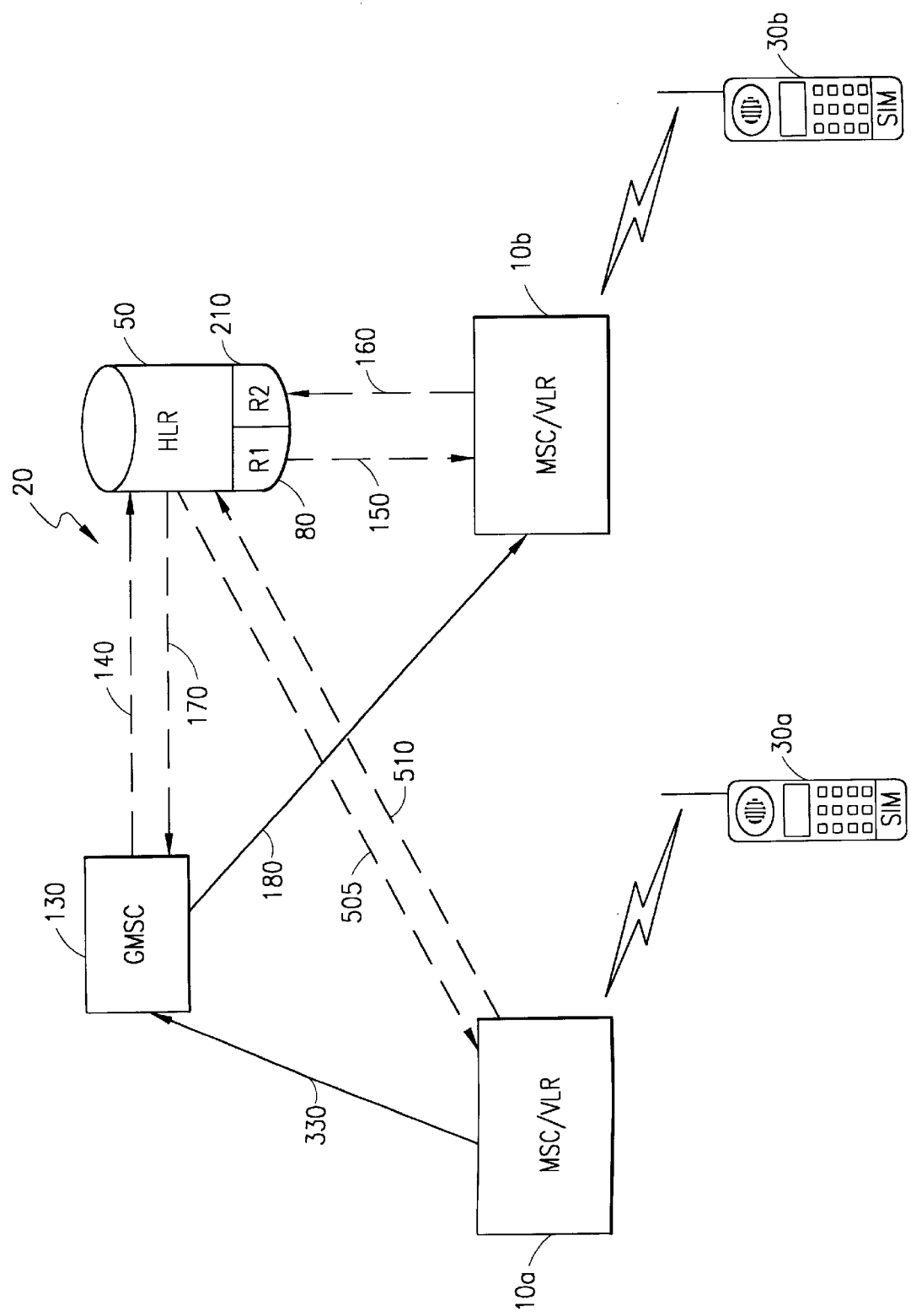
FIG. 7 is a block diagram of a mobile telecommunications network illustrating one mobile station originating an outgoing call connection towards the other mobile station assigned to the same directory number.

FIG. 7 is a block diagram of the PLMN 20 illustrating one mobile station originating an outgoing call connection towards the other mobile station assigned to the same MSISDN number. The first mobile station 30a attempts to originate a call connection towards the second mobile station 30b by dialing its own MSISDN number. The first MSC/VLR 10a then ignores the fact that the first mobile station 30a is attempting to dial its own directory number. An outgoing call connection is then initiated by transmitting an Initial Address Message (IAM) signal with the dialed MSISDN number. The transmitted IAM signal further includes the first IMSI number associated with the first mobile station 30a. The serving telecommunications network, such as a Signaling System No. 7 (SS7) telecommunications network (not shown in FIG. 7), then routes the transmitted IAM signal to the GMSC 130 associated with the provided MSISDN number. As a result, a call connection, such as a trunk connection 330, is established between the first MSC/VLR 10a and the GMSC 130. In a conventional manner, the GMSC 130 then transmits a MAP based signal 140 requesting routing instructions to the HLR 50. The transmitted MAP based signal 140 further includes the first IMSI number. By evaluating the IMSI numbers stored at the memory locations R1 80 and R2 210 and correlated with the dialed MSISDN number, the HLR determines that the received IMSI number associated with the calling party mobile station matches the IMSI number stored at the memory location R1 80. In response to such a determination, the HLR 50 presumes that the first mobile station 30a is attempting to establish a call connection with the second mobile station 30b. Accordingly, the HLR 50 retrieves the other IMSI number stored at the memory location R2 210. Utilizing the location data representing the second MSC/VLR 20b currently serving the second mobile station 30b, the HLR 50 then transmits a signal 150 requesting a roaming number. In a conventional manner, the second MSC/VLR 10b assigns a roaming number representing the second mobile station 30b, and returns the roaming number back to the HLR 50 via another signal 160. The received roaming number is then forwarded to the GMSC 130 via yet another signal 170. Utilizing the received roaming number representing the second mobile station 30b traveling within the second MSC/VLR coverage area, the received incoming call connection originated by the first mobile station is then forwarded to the second MSC/VLR 10b. As a result, a call connection between the two mobile stations associated with the same MSISDN number is established.

As another embodiment of the present invention, the first mobile station 30a attempts to originate a call connection towards the second mobile station 30b by similarly dialing its own MSISDN number as fully described above. In a similar manner as described above, the HLR 50 receives the MAP based signal 140 requesting routing instructions from the GMSC 130. Instead of comparing the IMSI numbers, in case both mobile stations are active, the HLR 50 first attempts to forward the call connection to the primary mobile station. In case the second mobile station 30b is the primary mobile station, a call connection is accordingly established between the first mobile station and the second mobile station as desired. On the other hand, if the first mobile station is the primary mobile station, as fully described in FIG. 5, a return MAP based signal 510 from the MSC/VLR serving the first mobile station 30a identifies that the first mobile station 30a is busy. The first mobile station 30a is busy because it is currently involved in a call setup towards the second mobile station 30b. Even if the first mobile station 30a has Call Waiting active, because the first mobile station is in unstable line condition (no speech connection established yet), the call waiting feature cannot be invoked. Accordingly, the MAP based signal 510 with an indication that the first mobile station 30a is busy is returned to the HLR 50. In response, the HLR 50 transmits another MAP based signal 150 to the second MSC/VLR 10b and, as a result, accordingly reroutes the call connection to the second mobile station 30b. A call connection 180 is then established between the first mobile station 30a and the second mobile station 30b.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for routing an incoming call connection towards a mobile station within a Global System for Mobile (GSM)Communications network wherein said incoming call connection identifies a telephone number as the called party number, and wherein said telephone number is assigned to at least two different mobile stations, each said mobile station having a different International Mobile Subscriber Identity (IMSI) number associated therewith, said method comprising the steps of:

receiving an indication that an incoming call has been received with said telephone number;

determining that said received telephone number is associated with more than one IMSI number;

identifying that said incoming call was originated from the mobile station associated with a first one of said more than one IMSI numbers;

selecting a second one of said more than one IMSI numbers associated with that said received telephone number; and routing said received incoming call connection to said mobile station associated with said selected second one of said IMSI numbers.

2. The method of claim 1 wherein said steps are performed at a home location register (HLR) associated with said received telephone number.

3. The method of claim 2 wherein said step of receiving said indication further comprises the step of receiving a Mobile Application Part (MAP) based signal requesting a routing instruction at said HLR.

4. The method of claim 1 wherein said step of selecting said second one of said more than one IMSI number further comprises the step of selecting the IMSI number, other than said first IMSI number, for the mobile station that is currently active.

5. The method of claim 4 wherein said mobile station is active when a Mobile Application Part (MAP) based signal has been received with a current location of said mobile station.

6. The method of claim 5 wherein said MAP based signal comprises an International Mobile Subscriber Identity Attach (IMSI Attach) signal.

7. The method of claim 5 wherein said MAP based signal comprises a location update signal.

8. The method of claim 4 wherein, in case there are more than one mobile stations active at the same time, said step of selecting said second one of said more than one IMSI numbers further comprises the step of selecting the IMSI number, other than said first IMSI number, for the mobile station that is preassigned as a primary mobile station.

9. The method of claim 4 wherein, in case there are more than one mobile stations active at the same time, said step of selecting said second one of said more than one IMSI numbers further comprises the step of selecting the IMSI number, other than said first IMSI number, for the mobile station that is currently not busy.

10. A method for routing an incoming call connection received with a particular telephone number within a Global System for Mobile (GSM) Communications network, said telephone number being associated with two International Mobile Subscriber Identity (IMSI) numbers each representing a different mobile station, said method comprising the steps of:

receiving at a home location register (HLR) associated with said telephone number an indication from a gateway mobile switching center (GMSC) that an incoming call has been received with said telephone number;

identifying at said HLR the IMSI numbers for said two mobile stations associated with said received telephone number;

identifying, by said HLR, that said incoming call was originated from one of said mobile stations associated with one of said IMSI numbers associated with said received telephone number;

determining the other one of said IMSI numbers associated with said received telephone number; and instructing said GMSC to reroute said received incoming call to the other one of said mobile stations associated with the other one of said IMSI numbers associated with said received telephone number.

* * * * *